United States Patent Office 3,022,218
Patented Feb. 20, 1962

3,022,218
ANTIBIOTICS IN FEEDS
William C. Sherman, Terre Haute, Ind., assignor to Chas. Pfizer & Co., Inc., New York, N.Y., a corporation of Delaware
No Drawing. Filed Jan. 31, 1961, Ser. No. 86,001
10 Claims. (Cl. 167—53)

This invention relates to animal feeds which contain a tetracycline-type antibiotic as the principal therapeutic ingredient. More particularly, it is concerned with a method for enhancing the therapeutic efficacy of these type antibiotics, especially when they are incorporated in animal feeds.

In the past, it was the common practice to administer such broad-spectrum antibiotics like those of the tetracycline group (e.g., chlortetracycline, bromtetracycline, tetracycline, oxytetracycline, 6-demethylchlortetracycline, etc.) to animals via their feeds for purposes of growth promotion as well as for medicinal reasons. Unfortunately, certain added or natural constituents of feed tend to bind these tetracycline-type antibiotics or slow down their rate of absorption so that lower blood levels are obtained than would otherwise be the case. Animal feeds normally contain anywhere from about 0.4% to about 3% of calcium, calculated as the metallic ion; this happens to be the principal offender with respect to the aforementioned binding action. The presence of the calcium is usually provided by calcium carbonate, which is the calcium compound that is most often blended with commercial feeds. Furthermore, the normal constituents for animal feeds such as grain and protein supplements ordinarily contain considerable amounts of calcium, and this is especially true in the case of such feedstuff constituents as bone meal, fish meal, meat scrap, defluorinated rock phosphate and dicalcium phosphate.

In accordance with the prior art, the use of a lower level calcium diet (0.5%) has been suggested as means for overcoming this problem. However, this method has the attendant disadvantage of being limited as to its duration of use inasmuch as the prolonged administration of said feeds would cause serious malnutrition problems to ensue. Ultimately, such a program would even lead to more critical conditions such as rickets and the like. Hence, it is only possible to use this method over short periods of time and there has been no way of adequately supplying the required amounts of calcium continuously without seriously detracting from the tetracycline-type antibiotic blood levels. A proposed way of overcoming this problem is to use calcium sulfate in lieu of calcium carbonate or dicalcium phosphate. However, while this particular method does the job as far as satisfactory blood levels are concerned, it suffers from the disadvantage of causing wet droppings to occur due to the irritation of the intestinal mucosa. In addition, it has the further disadvantage of causing a decrease in the feed efficiency in general, probably due to the limited availability of the calcium in this particular form. Still another prior art method that has been tried involves the use of soft phosphates (colloidal clay), whereby fairly high blood levels are obtained only if this material is employed at concentration levels which are considered to be too toxic for the animal organism. This is due to the fact that said phosphates contain a considerable amount of fluorine. Hence, they are necessarily restricted to use at low level concentrations where they are largely ineffective in providing the required amount of calcium for the diet.

In accordance with the present invention, it has now been found that all the foregoing disadvantages can largely be overcome and the attendant problems solved by using calcium silicate as the principal calcium source. In this way, high antibiotic blood levels have been obtained without seriously impeding the growth of the animal or causing any serious malnutrition to ensue. As a result, the long-awaited solution to a problem affecting the industry in general has not only been accomplished, but also a considerable economic gain is thereby realized due to the saving in time and expense by the use of this method. In order to achieve these outstanding results, it is only necessary that the bulk of the animal's daily calcium requirement be provided by using calcium silicate in place of the other calcium sources previously enumerated. Thus, when the calcium carbonate:calcium silicate weight ratio (or, for that matter, the calcium X:calcium silicate weight ratio where X is an anion other than silicate, such as sulfate, phosphate, etc.) is not greater than about 1:3 and when the calcium carbonate (or calcium X) concentration level is not in excess of 0.5% by weight of the total weight of the animal feed, good antibiotic blood levels are obtained without the disadvantages which attend the alternate routes or prior art methods hereinbefore discussed. In general, the daily total calcium content will preferably range from about 0.4% to about 3.0% by weight of the total composition, although this will vary to some extent depending upon the animal's weight, its individual response to said feed composition and the particular species of animal being treated. Of this total calcium content, all in excess of about 0.5% by weight of calcium should preferably be provided by the calcium silicate, although it is only necessary to use a sufficient amount of same as previously indicated for the obtainment of satisfactory results. The antibiotic component of the feed may vary, in turn, anywhere from about 50 g. up to about 800 g. per ton of said feed, and in practice, it is convenient to mix the antibiotic with the calcium silicate-containing feed, although it can also be administered separately such as, for example, by way of the animal's drinking water.

It is to be understood, of course, that by the use of the term tetracycline-type antibiotic there is meant to include not only such amphoteric compounds as chlortetracycline, bromtetracycline, tetracycline, oxytetracycline, 6-demethylchlortetracycline, 6-demethyltetracycline, 6-demethyl-6-deoxytetracycline, and the like, but also acid addition salts thereof such as the hydrochloride, hydrobromide, hydriodide, sulfate, nitrate, phosphate, acetate, lactate, maleate, citrate, tartrate and ascorbate, as well as base salts of same such as the sodium, potassium, calcium, quaternary ammonium or ethylene diamine salts thereof, or the aluminum gluconate complex or other organic acid complex salts thereof, or any other pharmaceutically acceptable salts of these particular antibiotics which happen to be therapeutically effective per se.

The herein described feeds of this invention have been found to be particularly outstanding and valuable in the case of such animals as chickens, turkeys, ducks, hogs, swine, lambs, sheep, cattle and various other poultry. In particular, they are especially useful for starting turkeys, as well as for laying and breeding hens and turkeys. The tetracycline-type antibiotic may, of course, be administered via one component of the feed, as aforesaid, or it may be uniformly blended or distributed throughout a mixed feed. In this connection, it should also be noted that a wide variety of feed components may be of use in the nutritional diets of this invention. A type of conventional feed material for just such purposes and one which is often preferred in the operation of this invention is that which generally follows the suggested formulae set forth on page six of the authoritative pamphlet issued by the National Research Council (Washington, D.C., June 1944) and entitled "Recommended Nutrient Allowance for Poultry." For instance, feed compositions are recommended to contain roughly between about 50% and about 80% of grains, such as ground grain or grain by-products, molasses and other sugar by-products; between about 3% and about 10% of animal protein, such as fish meal, meatscraps, and the like; between about 5% and about 30% of vegetable protein, such as soybean oil meal, peanut meal, cottonseed meal, and the like; and between about 2% and about 5% of minerals, such as bone meal, limestone, and so forth; together with supplementary vitaminaceous sources, such as thiamine, riboflavin, niacin, etc. Furthermore, the growth-promoters of this invention may either be used in said feeds alone or in conjunction with various other antibiotics and chemotherapeutic agents, such as penicillin, bacitracin, sulfaquinoxaline, phenylarsonic acid, hydroxyzine, oleandomycin, and so on.

In accordance with a more specific embodiment of this invention, a typical feedstuff for poultry may be prepared by mixing the following ingredients in the proportions by weight specified below:

| | |
|---|---|
| Ground yellow corn | 45.2 |
| Soybean oil meal (51%) | 24.3 |
| Animal fat | 9.40 |
| Dicalcium phosphate | 1.50 |
| Sodium phosphate, dibasic (21.8%) | 1.30 |
| Calcium silicate (13%) | 13.5 |
| Oxytetracycline hydrochloride (10 g./lb.) | 1.0 |
| Alfalfa meal, 17% protein | 2.50 |
| Sodium chloride, iodized | 0.60 |
| Choline chloride (25%) | 0.23 |
| Vitamin A (10,000 I.U./g.) | 0.05 |
| Vitamin $D_3$ (3,000 I.U./g.) | 0.05 |
| Vitamin E (100,000 I.U./lb.) | 0.05 |
| Vitamin $B_{12}$ (10 mg./lb.) | 0.12 |
| Trace mineral mix[1] | 0.10 |

[1] Trace mineral mix has the following composition: manganese, 6.0%; iodine, 0.1%; iron, 2.0%; copper, 0.2%; zinc, 0.006%; cobalt, 0.02%; calcium, 26.5%; and magnesium, 1.9%.

Needless to say, many other comparable feeds may also be blended in a similar manner.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A group of 160 Hyline, single-comb White Leghorn laying hens which had been in egg production for approximately three months were fed on an antibiotic-free, normal calcium diet for a period of three days. This diet consisted of a 16% protein ration containing ground yellow corn, soybean oil meal, animal fat and alfalfa meal in addition to mineral and vitamin supplements, including a sufficient amount of added calcium carbonate and dicalcium phosphate to provide a total calcium content of 2.25% by weight and a total phosphorus content of 0.65% by weight, based on the amount of available phosphorus.

At the end of this period, a group of twenty of these hens received this same diet together with a sufficient amount of oxytetracycline hydrochloride at the expense of the yellow corn meal to provide an antibiotic concentration level of 200 g. per ton of feed. A second group of twenty birds were also fed this same antibiotic-containing diet except that 78% of the total calcium content of 2.25%, i.e., 1.75% calcium, was now provided by an equivalent amount of calcium silicate at the sole expense of the calcium carbonate (see the table hereinbefore set forth in the discussion section). Blood levels from each of these two treatments were then determined at the end of 27, 51 and 75 hours, employing a total of four birds for each determination and pooling the blood from two birds so that two blood samples will be available from each treatment at the time of assay. The results obtained in this manner are presented below in the following table where the oxytetracycline blood levels are expressed in terms of parts per million and the calcium carbonate-oxytetracycline determination is arbitrarily assigned a potentiation index value of 100 since it has been taken as the standard (normal calcium diet):

| Calcium Source | Oxytetracycline Serum Levels, p.p.m. | | | | Potentiation Index |
|---|---|---|---|---|---|
| | 27 hrs. | 51 hrs. | 75 hrs. | Avg. | |
| Calcium carbonate | 0.075 | 0.19 | 0.17 | 0.147 | 100 |
| Calcium silicate | 0.21 | 0.23 | 0.27 | 0.236 | 161 |

It was also found that egg production and/or egg shell thickness were both not affected by this change in diet.

*Example II*

Thirty-two 6-week old pigs were allotted to four treatments and fed the same diet as was used in the previous example except that these particular rations all contain a total calcium content of approximately 0.65%, of which 0.60% is derived from either one of two sources, viz, dicalcium phosphate-calcium carbonate, 50%–50%, and dicalcium phosphate-calcium silicate, 50%–50%. Oxytetracycline hydrochloride is then added to the rations of these two groups at levels of 200 and 500 g./ton, respectively. Blood serum levels of pooled samples are then determined in the usual manner at 7-weeks of age, and it was found that the serum levels obtained with the dicalcium phosphate-calcium silicate source are 50–100% higher than those obtained with the dicalcium phosphate-calcium carbonate source at either of the two aforementioned antibiotic concentration levels.

*Example III*

The procedure described in Example I is repeated except that other antibiotics such as tetracycline hydrochloride and chlortetracycline hydrochloride are each individually employed in lieu of the oxytetracycline hydrochloride used in the aforementioned example. In these cases, the potentiation indices obtained are substantially the same as those reported for the oxytetracycline hydrochloride.

In like manner, the use of other forms of tetracycline-type antibiotics, such as bromtetracycline hydrobromide, the magnesium salt of oxytetracycline, chlortetracycline acid sulfate and the parent amphoteric tetracycline base, all afford results which are comparable in every way with those obtained in the first example.

*Example IV*

Three lots of fifty turkey poults were each fed regular turkey starter and grower rations for periods of up to sixteen weeks. These rations were essentially the same as the diet employed in Example I except that the starter rations (used for the first eight weeks) contained a 28% protein content and the grower rations (used for the second eight weeks) contained a 20% protein content. One group of animals received the regular turkey rations containing 2.0% by weight of calcium supplied as calcium carbonate and dicalcium phosphate with no oxytetracycline hydrochloride. A second group received the same forms of calcium with added oxytetracycline hydrochloride at the 200 g./ton concentration level. A third group received the same rations as the second group except that no calcium carbonate was present, said feeds containing 0.5% by weight of calcium as dicalcium phosphate with the remainder as calcium silicate. Blood samples taken at various time intervals throughout the feeding period showed that the oxytetracycline serum levels of the last group were 40 to 70% higher than those obtained in the case of the second group where conventional sources of calcium were employed.

What is claimed is:

1. An animal feed composition comprising a therapeutically-effective amount of a tetracycline-type antibiotic and a nutritionally-balanced animal feed containing a source of calcium wherein no more than about 0.5% by weight of the calcium is present in a form other than calcium silicate and the weight ratio of the calcium silicate to calcium X is at least about 3:1, X being an anion other than silicate.

2. An animal feed composition as claimed in claim 1 wherein the tetracycline-type antibiotic is oxytetracycline hydrochloride.

3. An animal feed composition as claimed in claim 1 wherein the tetracycline-type antibiotic is tetracycline hydrochloride.

4. An animal feed composition as claimed in claim 1 wherein the tetracycline-type antibiotic is selected from the group consisting of chlortetracycline, tetracycline, oxytetracycline, and their therapeutically-effective salts.

5. An animal feed composition as claimed in claim 4 wherein the tetracycline-type antibiotic is present in an amount that is in the range of from about 50 g. up to about 800 g. per ton of feed.

6. An animal feed composition comprising a therapeutically-effective amount of a tetracycline-type antibiotic and a nutritionally-balanced animal feed containing calcium silicate as the principal source of calcium.

7. An animal feed composition as claimed in claim 6 wherein the tetracycline-type antibiotic is present in an amount that is in the range of from about 50 g. to 800 g. per ton of feed.

8. An animal feed composition as claimed in claim 7 wherein the tetracycline-type antibiotic is selected from the group consisting of chlortetracycline, tetracycline, oxytetracycline, and their therapeutically-effective salts.

9. In a process for administering a tetracycline-type antibiotic admixed with an animal feed containing calcium, the improvement which consists of orally administering a feed in which at least about 75% by weight of the calcium is present as calcium silicate and the total amount of calcium in a form other than calcium silicate is no more than about 0.5% by weight of the total feed.

10. In a process for administering a tetracycline-type antibiotic admixed with an animal feed containing calcium, the improvement which consists of orally administering a feed in which the calcium requirement is present principally in the form of calcium silicate.

References Cited in the file of this patent
UNITED STATES PATENTS
2,962,378    Huhtanen _____ Nov. 29, 1960